(12) United States Patent
Di Claudio et al.

(10) Patent No.: US 7,031,704 B2
(45) Date of Patent: Apr. 18, 2006

(54) SYSTEM FOR MANAGING THE IDENTITY OF MOBILE STATIONS ROAMING BETWEEN MOBILE RADIO NETWORKS

(75) Inventors: Valerio Di Claudio, Chieti Scalo (IT); Carlo Eynard, Turin (IT); Salvatore Riccobono, Varese (IT); Guglielmo Tomaselli, Turin (IT)

(73) Assignees: Telecom Italia, Milan (IT); MMA-Marconi Mobile Access S.p.A., Chieti Scalo (IT)

( * ) Notice: Subject to any disclaimer, the term of this patent is extended or adjusted under 35 U.S.C. 154(b) by 56 days.

(21) Appl. No.: 10/504,041

(22) PCT Filed: Jan. 28, 2003

(86) PCT No.: PCT/EP03/00836

§ 371 (c)(1),
(2), (4) Date: Jan. 10, 2005

(87) PCT Pub. No.: WO03/067910

PCT Pub. Date: Aug. 14, 2003

(65) Prior Publication Data

US 2005/0130654 A1    Jun. 16, 2005

(30) Foreign Application Priority Data

Feb. 6, 2002  (IT)  .......................... TO2002A0100

(51) Int. Cl.
*H04Q 7/20* (2006.01)
*H04B 1/38* (2006.01)
*H04M 1/00* (2006.01)

(52) U.S. Cl. ................ 455/432.1; 455/435.1; 455/423; 455/560; 455/552.1; 455/554.1

(58) Field of Classification Search ............ 455/554.1, 455/554.2, 560, 432.1, 433, 435.1, 423, 424, 455/561, 552.1
See application file for complete search history.

(56) References Cited

U.S. PATENT DOCUMENTS 5,590,175 A * 12/1996 Gallant et al. ............... 455/433
6,272,450 B1 * 8/2001 Hill et al. ..................... 703/13

FOREIGN PATENT DOCUMENTS

| EP | 0 923 258 | 6/1999 |
| WO | WO 99/48312 | 9/1999 |
| WO | WO 99/55107 | 10/1999 |

* cited by examiner

*Primary Examiner*—William Trost
*Assistant Examiner*—Wesley Kim
(74) *Attorney, Agent, or Firm*—Herbert Dubno

(57) ABSTRACT

System for managing the identities of mobile stations roaming between mobile radio networks, operating within a private mobile radio network, constituted by one or more base transceiver stations (BTS; Node B) and by a reference base station controller (BSC; RNC), which realize a normal base station subsystem (BSS; RNS) within the public mobile radio network, characterised in that upon registration of the roaming mobile station (MS), authorized to access the private mobile radio network, the system (VIM) simulates, from the base station subsystem (BSS; RNS) towards the mobile switching center (MSC) of the competent network switching subsystem (NSS), the behaviour of the mobile station, whereto it has associated the identity profile selected from a group of identity profiles held by the operator of the visited network, and in wholly similar form, from the mobile switching center (MSC) towards the base station subsystem (BSS), the system (VIM) simulates the behaviour of the competent network switching subsystem (NSS) during the salient steps of the registration of the roaming mobile station, in such a way as to assure the correct execution of the procedure itself.

19 Claims, 3 Drawing Sheets

SYSTEM FOR MANAGING THE IDENTITY OF MOBILE STATIONS ROAMING BETWEEN MOBILE RADIO NETWORKS

CROSS REFERENCE TO RELATED APPLICATIONS

This is a national stage of PCT/EP 03 00836 filed Jan. 28, 2003 and based upon Italian application TO 2002 A000100 filed Feb. 6, 2002 under the International Convention.

1. Field of the Invention

The present invention relates to mobile telephony systems and in particular to a system for managing the identities of mobile stations roaming between mobile radio networks.

2. Background of the Invention

As is well known, when a user of the mobile radio service, in his/her capacity as an employee of a company with several branches situated in different locations of the same country or abroad, connects with his/her cellular phone to the radio-electric coverage of a private network belonging to one of the branches of the company, he or she can generally complete voice calls without any problems, as provided for instance by the ETSI standard of the GSM or the 3GPP standard of the UMTS system, provided his/her user profile has previously been recorded in an appropriate company database. If instead he or she should wish to obtain different services, such as data services or weather, traffic, location, and other information services offered by the local operator and based for instance on GSM or UMTS technologies, he or she would not be able to do so due to the incompatibility between his/her mobile station and the infrastructure of the visited mobile network. The voice communication service can always be obtained, however the fees charged by the operator of the visited mobile network, based on agreements covering the roaming between different mobile radio networks, entail costs that are generally higher than those charged to the operator's own subscribers. Currently, the only way to overcome such problems is physically to replace the mobile station with another mobile station provided with a card issued by the operator of the visited network, distinguished by a code recognized by said operator. This forces the company, interested in allowing its visitors to benefit from the services made available by the local operator, to obtain a rather sizeable number of mobile terminals and of cards to be assigned on each occasion, which obviously entails considerable cost.

The cost problem is not the only one encountered in this situation: the interested company would have to incur, in addition to the cost deriving from the change of mobile terminal and card, also other charges, such as the adoption of a new MSISDN (Mobile Station ISDN Nuniber) belonging to the operator of the visited mobile radio network.

Summary of the Invention

The aforesaid drawbacks are overcome and the described technical problems are solved by the system for managing the identities of mobile stations roaming between mobile radio networks, provided by the present invention, which allows the user roaming between mobile radio networks to access the services made available by an operator of a visited mobile network, benefiting from the aforesaid services without having to replace, in the telephone set, the card of the original subscription with a card of the network of the visited country. It is thereby possible to reduce traffic costs and assure a greater portion of traffic to the operator who provides the aforesaid services.

This is achieved in a system for managing the identities of mobile stations roaming between mobile radio networks, operating within a private mobile radio network, constituted by one or more base transceiver stations (BTS; Node B) and by a reference base station controller (BSC; RNC), which realize a normal base station subsystem (BSS; RNS) within the public mobile radio network. Upon registration of the roaming mobile station (MS), authorized to access the private mobile radio network, the system (VIM) simulates, from the base station subsystem (BSS; RNS) towards the mobile switching centre (MSC) of the competent network switching subsystem (NSS), the behavior of the mobile station, whereto it has associated the identity profile selected from a group of identity profiles held by the operator of the visited network. In wholly similar form, from the mobile switching center (MSC) towards the base station subsystem (BSS), the system (VIM) simulates the behavior of the competent network switching subsystem (NSS) during the salient steps of the registration of the roaming mobile station, in such a way as to assure the correct execution of the registration procedure itself.

BRIEF DESCRIPTION OF THE DRAWING

These and other characteristics of the present invention shall become readily apparent from the following description of a preferred embodiment thereof, reference being made to the accompanying drawings in which.

SPECIFIC DESCRIPTION

In the description that follows, reference shall be made by way of example to an internationally roaming user, who is provided with a mobile station fitted with SIN card and who operates within the GSM system. Direct extension to the TINTS standard is foreseen, placing the TINTS VIM equipment in the control plane of the lugs interface, between the 3G MSC and the RNC. In this case it operates on EANAP messages carrying corresponding information in the TINTS standard. For sake of simplicity only operations in the GSM environment will be described in detail in following paragraphs. Notwithstanding, in the following description, a detailed reference to the TINTS environment will be in some cases provided (references shown in brackets).

Figure 1:
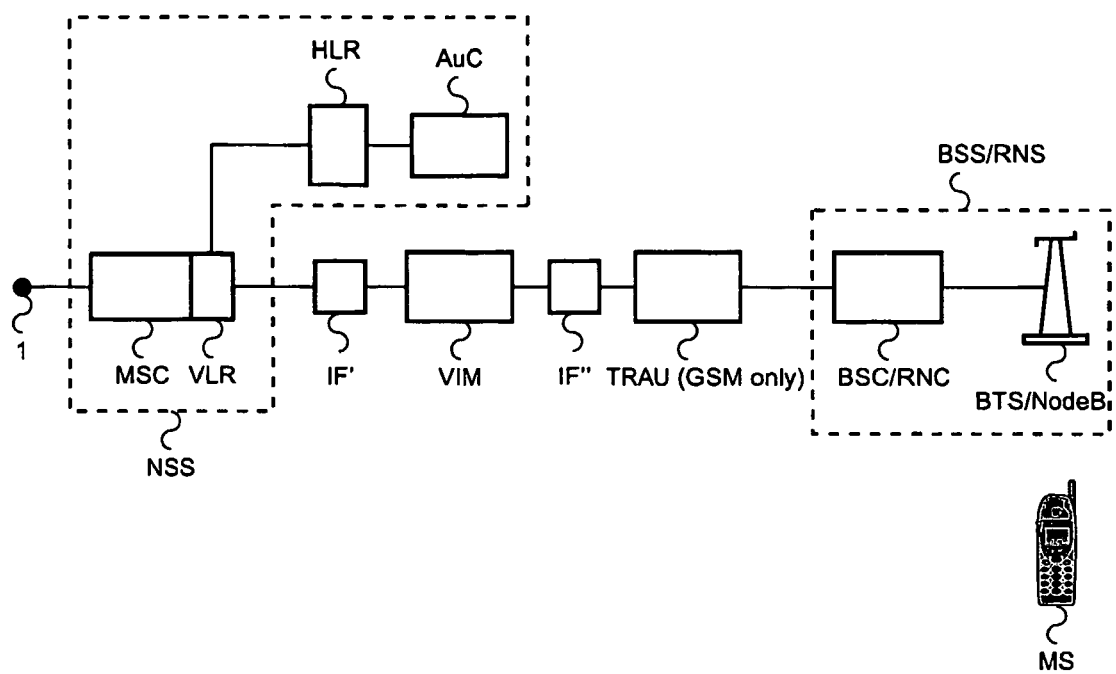
FIG. 1 is a block diagram of the overall network architecture that incorporates the system of the invention.

When the user, accessing his/her mobile station, tries to register him/herself with the Public Land Mobile Network (PLMN) of the visited nation, some procedures are activated which imply an exchange of information between the mobile station, constituted by the mobile terminal and by the SIM card contained therein, and the records of the GSM public mobile radio network. In this procedure, an essential is the authentication procedure, activated at the Authentication Centre (AuC) belonging to the public mobile radio network of the operator of the visited nation. This procedure shall now be described with reference to FIG. 1, which shows the overall network architecture that incorporates the system of the invention. As stated, within the authentication procedure an exchange of information is activated; such information consists of signalling messages between the mobile station MS (UE, User Equipment in the UMTS scenario) and the public network PLMN. Said exchange enables a consequent exchange of information between the AuC and the MS. The signalling messages are transported within a predefined GSM signalling time interval, called time slot (ATM VCNP in the UMTS scenario), characterised by a bit rate of 64 Kbit/s and constituting the signalling stream on common channel CCSS (Common Channel Signalling System) no. 7 (BB CCSS no. 7 in the UMTS scenario), present on the interface A (Iugs in the UMTS scenario), which connects the Mobile Switching Centre MSC of the Network Switching Subsystem NSS with the Base Station Controller BSC (RNC, Radio Network Controller in the UMTS scenario) of the Base Station Sub-system BSS (RNS, Radio Network System in the UMTS scenario) located at the visited company. The interface A is shown in FIG. 1 split in its two parts IF'and IF", the first towards the NSS, the second towards the BSS. Moreover, the connection 1 allows to connect the MSC to the other public networks involved in the transmission.

As is well known, the BSC is tasked with managing the radio interface, i.e. it allocates and release the radio channels and it carries out the handover procedures. It is connected on one side to multiple BTS (Node B in the UMTS scenario) and on the other side to the MSC of the NSS.

FIG. 1 also shows the Transcoder and Rate Adapter Unit (TRAU), tasked with transcoding the GSN voice streams from 13 Kbit/s to 64 Kbit/s. The system of the invention, as previously stated, finds its application in a private GSM mobile radio network, constituted by one or more Base Transceiver Stations (BTS), which, together with the reference BSC controller that manages them, are seen by the public mobile radio network as a normal BSS subsystem.

The transmission on the interface A present between the NSS and the reference BSS of this GSM signalling time slot takes place, according to the invention, by means of the system for the real management of the SIM card identities, indicated as VIM (Virtual Identity Manager), interposed between the two aforesaid public mobile radio network entities, i.e. the switching centre MSC of the NSS and the base radio station controller BSC of the BSS.

In this context, the registration procedure provided by the GSM standard (Technical Specification GSN 03.12) involves, in addition to the system VIM, the traditional GSM network elements of the mobile radio operator, such as the Home Location Register HLR, the AuC, the Visitor Location Register VLR of the MSC, the BSS, composed by the BSC plus the reference base station BTS (Node B) and the mobile station MS.

In particular, when an international roaming user is registered, the system VIM simulates, from the BSS towards the MSC of the NSS, the behavior of the mobile station, whereto it has associated the identity profile held by a new SIM card, selected among those made available by the local operator; in wholly similar form, from the MSC of the NSS towards the BSC of the BBS, the system VIM simulates the behaviour of the NSS during the salient steps of the registration of the mobile station MS, in such a way as to assure the correct execution of the registration procedure itself.

The technical modes that allow the VIM successfully to complete the signalling procedure relating to the registration of the roamer user shall now be described in greater detail.

Upon the activation the GSM registration procedure, induced by the roamer user by means of his/her mobile station, the GSM standard provides for the corresponding GSM signalling information stream to travel in the direction that goes from the BSC of the BBS to the MSC of the NSS; the GSM time slot at 64 Kbit/s composing the signalling stream, transiting on the interface A, reaches the MSC connected to the destination NSS. The MSC isolates and process the information content needed to carry out the authentication procedure that is subsequently transmitted to the AuC associated to the competent HLR. The AuC is tasked with carrying out and completing the authentication procedure associated with the GSM registration procedure.

In the presence of the system VIM, the aforesaid signalling time slot before entering the BSS passes through the same system VIM, where analysis, filtering, processing and message generation operations are performed on the interface A in both directions.

Analyzing the operations in greater detail, at the time a roamer user enters into the coverage of the private mobile radio network, whereto the system VIM is connected, he or she is independently forced by the PLMN network of the visited nation to present him/herself with his/her own International Mobile Subscriber Identity (IMSI), instead of the Temporary International Mobile Subscriber Identity (TIMSI).

With this information, the system VIM is able to query its database to see whether the user is authorized to replace the identity profile. If not, the VIM behaves in transparent fashion, otherwise it activates the identity replacement procedures. At the start of the GSM registration procedure, before the associated GSM messages reach the destination MSC, they are captured by the VIM which registers within itself the mobile station, i.e. detects the identity of origin of the SIM card of the roamer user (IMSI identifier) and the International Mobile Equipment Identity (IMEI) of the mobile terminal and to note its presence in its database.

During the entire remaining part of the mobile station registration procedure, the system VIM associates the ordered set of data, which define the identity profile of the SIM card of origin owned by the roamer user and present in its mobile station, a second set of data, formally similar to the first and representing the identity profile of a SIM card issued by the operator of the visited network and adopts one of the IMEI codes it has available to replace the IMEI code of origin of the mobile terminal. From this moment onwards, the roamer user will be distinguished, for the GSM public mobile radio network, from the new set of data provided by the system VIM.

It should be observed that the system VIM, through an Internet Protocol (IP) network interface, with which it is provided, can be connected to other system VIMs that, mutually interconnected, realise an international network of system VIMs. In this regard, it is possible to activate an "optional"GSM registration procedure, formally wholly similar to the one just described, with the system VIM of the private mobile radio network of origin, connected, through the aforesaid IP network interface, to the system VIM of the private mobile radio network visited by the roamer user.

Consequently, in the complex of the international network of system VIMs, the GSM registration procedure, optionally activated by the private mobile radio network of origin, allows to locate the internationally roaming user connected with the visited private mobile radio coverage of another nation. This location can be performed by the private mobile radio network of origin in all cases in which the system VIM of the visited private mobile radio network has previously replaced the identity profile of the original SIM card with the identity profile of a SIM card owned by the network operator of the visited nation.

From a more general point of view, it should be stressed that the optional registration procedures are synchronised by the system VIM of the private mobile radio network visited taken as reference system, i.e. as "master" system VIM. The master system VIM guarantees the correct sequence of events composing the registration procedure, necessary to prevent the occurrence of two registrations, distinguished by two identity profiles of the same roamer user, with the two system VIMs belonging to the respective private mobile radio networks, the one of origin and the visited one.

The processing of the 64 Kbit/s GSM time slots, one per direction, constituting the signalling stream present between the ESC and the MSC of the public mobile radio network of the visited nation, is carried out by the system VIM in the manner described hereafter. The extraction and the reinsertion on the physical layer of each of the 64 Kbit/s GSM time slots, connected with the aforesaid signalling stream, are carried out by the system VIM by means of a hardware device with which it is provided, which shall be described in detail hereafter.

After the extraction of the signalling time slot, the processing resources of the system VIM allow to identify and filter the Direct Transfer Application Part, DTAP (RANAP, Radio Access Network Application Part in the UMTS scenario) component of the messages transiting on the signalling time slot, it is possible to read, analyse and, as the case may be, modify the Mobility Management and Call Control Management contents of said DTAP component. Consistently with the technical specifications of the series 08 of the GSM standard, the DTAP level of the protocol stack present at the interface A represents the context within which are to be found all information elements pertaining to the identity profile of the SIM card held by the user, necessary to perform the operations carried out by the system VIM.

Once the processing is complete, the system VIM reassembles the messages with the processed DTAP component, replacing the "filtered" ones. The process must take place in compliance with the timing parameters configured in the system.

In this step, the user is informed of its new identity, adopted for the exchange of the signalling information with the public mobile radio network, through the transmission of a message (for example an SMS short message) by the system VIM, which attests to the completion of the registration of the user provided with a new profile assigned to him/her by the VIM. In particular, the message transmitted by the VIM notifies the user not only of his/her new identity, contained in the corresponding profile, but also the identifying parameters of his/her interest, such as the new MSISDN number.

Heretofore, the operation of the system VIM upon the activation of the procedure for registering an international roamer user has been described. A wholly similar process is carried out upon the activation of the de-registration procedure. However, it is important to stress that the system VIM, within the architectural context shown in FIG. 1, does not come into play only upon the activation of the mobile station registration or de-registration procedures, but also in all steps requiring an exchange of signalling information between the mobile station and the public mobile radio network of the visited nation, which could obviously be the information for the set up and execution of a voice or data GSM call.

Every time there is an exchange of information flows through the system VIM interposed between the BSC and the reference MSC, belonging to the mobile network operator, the same VIM ascertains that the call is not an emergency call, in which case it behaves in wholly transparent fashion, i.e. as if it did not exist in relation to the network. If the signalling stream is not associated to an emergency call, it generally provides for:

filtering and opening the DTAP component containing the user's identifying data;

exchanging the original identity profile of the SIM Card present in the mobile station with that of the SIM card made available by the system VIM;

modifying the parameters of the DTAP component in order to take into account the exchange of the identity profiles described in the above bullet point;

inserting the GSN signalling time slot with the DTAP component processed in the correct information stream transiting between the BSS and the NSS;

optionally transmitting to the system VIM of the private mobile radio network of origin, whereto it is interconnected through the IP network interface enabling the physical connection of multiple system VIMs, the parameters relating to the identity profile of the SIM card of origin, put in correspondence with those representing the identity profile of the SIN card made available by the visited private network.

Figure 2:
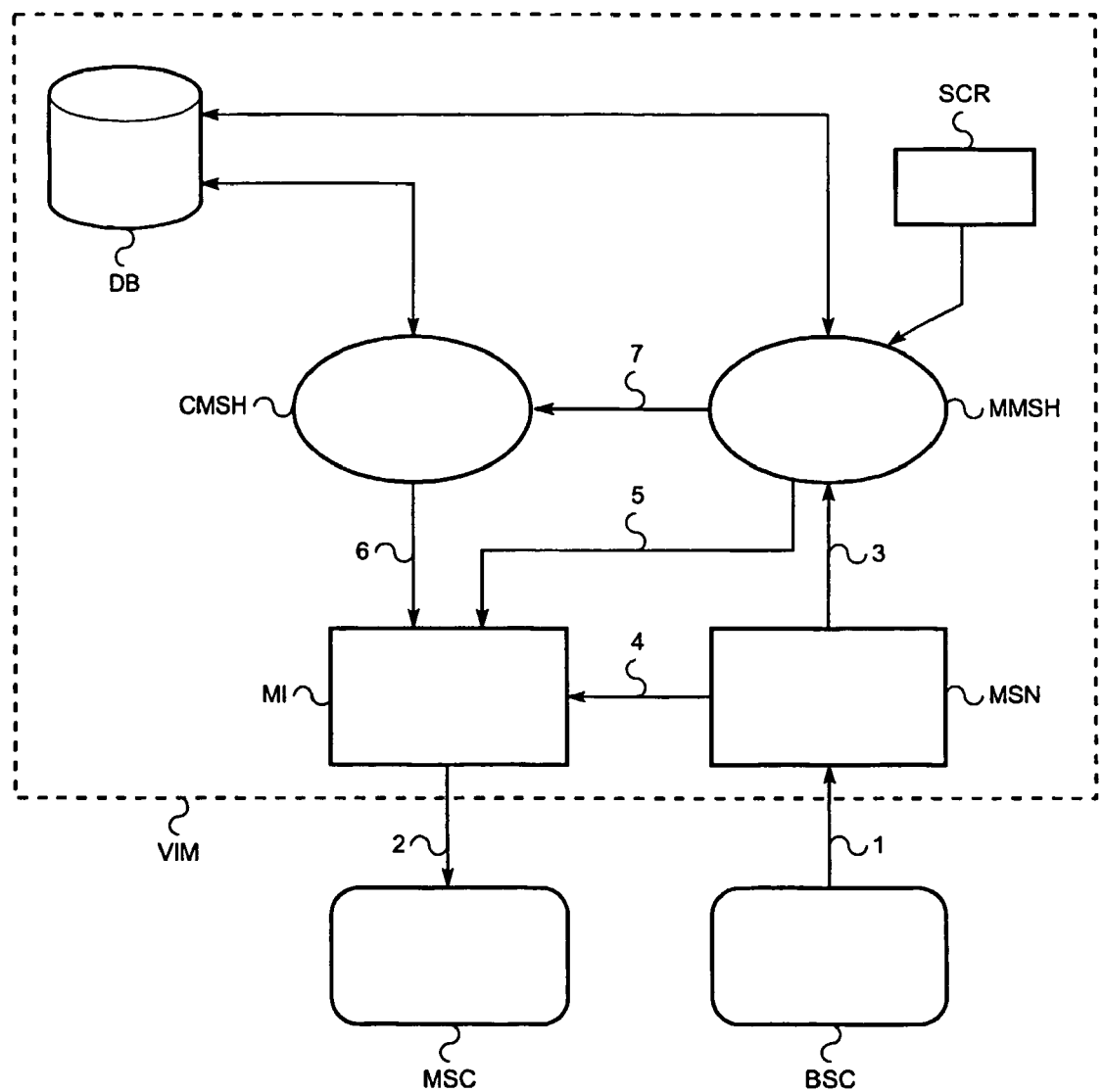
FIG. 2 is a functional architecture of the system.

An example of functional architecture of the system VIM, able to operate according to the aforesaid procedures, is now described with the aid of the representation shown in FIG. 2, relating to the transmission of the signalling in the NS-BSS-NSS (Uplink) link and in the NSS-BSS-MS (Downlink) link.

In particular, the case is now examined in which a series of messages contained in the 64 Kbit/s GSM signalling time slots is transmitted by the mobile station to the public mobile radio station, i.e. in the MS-BSS-NSS (Uplink) link.

Every time the message of a GSM signalling time slot, which carries information content related to the DTAP component, through the system VIM, is captured and subjected to a series of operations that process its content. Hence, once the processing is completed, the time slot is reinserted in its signalling flow. As stated previously, the information content of the DTAP component allows to carry out, for example, both Mobility Management and Call Control Management.

In the uplink, all GSM time slots coming from the BSC controller, both carrying DTAP signalling data, and non DTAP signalling data, are acquired within the system VIM through the input 1 by an MSN (Message Sniffer) element. This element opens the time slot and extracts therefrom the content relating to the DTAP component of the message. The component of the signalling time slot, carrying the non DTAP part of the message, is passed in the direction 4 to an MI (Message Injector) element, which shall provide, once the processing is complete, for reassembling the non DTAP component and the two DTAP components processed in the signalling time slot and to reinsert it through the output 2 in the direct stream towards the MSC of the NSS. The remaining content of the message thus extracted is delivered in the direction 3 to an Mobility Management SW Handler (MMSH) element and processed therein in the DTAP part relating to mobility management.

The MMSH element performs the following operations:
  it uniquely identifies the message carried by the GSM signalling time slot;
  it reads the corresponding signalling data, representative of the identity profile of the SIM card of origin of the roamer user, in the part pertaining to the mobility management protocol layer;
  it acquires from a database DB, internal to the system VIM, a set of data representative of the roamer user profile;
  it acquires from an appropriate SCR reader an identity profile of a SIM card, made available by the operator of the visited country;

it exchanges in orderly fashion the identity profile of the SIM card of the roamer user, contained in the signalling message, with the new identity profile of the SIM card read from the SCR. From this time on, and until the user completes a de-registration procedure, all messages with mobility management content, carried by the GSM signalling time slots in the MS-BSS-NSS link, will always be subjected to the exchange of the identity profile of the original or real SIN card of the roamer user with the identity profile of the new SIN card made available by the system VIM;

lastly, it analyses whether the message carried by the GSM signalling time slot contains data whose processing is the competence of the call management layer of the DTAP component itself. If so, MMSH releases the message to another Call Control Management SW Handler (CMSH) element, which processes the information carried by the aforesaid signalling message.

In particular, the message processed by the MMSH element is delivered in the direction 7 to the CMSH element, which performs a series of processing operations on the DTAP part relating to call management, formally wholly similar to those carried out within the context of mobility management by the MMSH element. The CMSH element exchanges the data pertaining to call management and relating to the identity profile of the SIN card of the roamer user, with the data necessary to assure the completion of call forwards the messages thus processed both to the base transceiver station (BTS; Node B) of the corresponding controller (BSC; RNC), and to the mobile station (MS) connected thereto. 3. System as claimed in claim 1, characterised in that it is connected through said iP network interfaces to other systems (VIM) which, mutually interconnected, form an international network and allow to activate a second registration procedure with the system (VIM) of the private mobile radio network of origin, in order to locate the mobile station situated within the visited private mobile radio coverage of another nation, after replacing the identity profile of the original card with the identity profile of the card owned by the operator of the visited network, the system (VIM) of the visited private mobile radio network being the reference system to assure the correct sequence of the registration procedure. 4. System as claimed in claim 13, characterised in that for the activation of said second registration procedure it uses the authentication parameters of the original card, transmitted through said IP network interface. 5. System as claimed in any of the previous claims, characterised in that said mobile and base transceiver stations and said mobile radio networks operate according to the GSM standard. 6. System as claimed in any of the previous claims, characterised in that said cards are SIM cards. 7. System as claimed in any of claims 1 to 14, characterised in that said mobile and base transceiver stations and said mobile radio networks operate according to the UIVITS standard. 8. System as claimed claim 17, characterised in that said cards are USIM cards. 9. System as claimed in any of the previous claims, characterised in that said roaming occurs internationally. management procedures, i.e. the data representative of the identity profile of the SIN card issued by the operator. For example, this latter profile could allow the activation of the called user's voice mail, the authorisation to use WAP, E-Mail services, etc.

At the end of the processing operations, the CMSH element releases the message containing the DTAP part thus processed to the MI element in the direction 6.

If instead the message carried by the GSM signalling time slot contains only data of competence of the element MMSH and hence not of competence of the CMSH element, the aforesaid message, once processed, is sent in the direction 5 directly to the element Mi, which inserts it in the appropriate signalling streams present in the system VIM.

In this way, until the call is dropped or released, all data used by the CMSH element tasked with call management, both relating to the identity profile of the SIM card of origin, and relating to the identity profile of the SIM card issued by the network operator of the visited nation are processed according to the procedures described heretofore.

Clearly, the element MI shall perform the aforesaid functions in compliance with the timing provided on the interface A by the GSM standardisation body ETSI, set out in the Technical Specification GSM 08.04 and in the Technical Specifications correlated therewith.

In the case of signalling transmission in the NSS-BSS-MS (Downlink) link, the same functional architecture described above for the MS-BSS-NSS (Uplink) link continues to be valid, keeping in mind that in this link the 64 K.bit/s time slots come from the MSC of the mobile radio switching network and are directed towards the BSS subsystem of the radio access network.

The system VIM, interposed between the NSS and the NSS, in this case carries out the necessary exchange of the identity profile data present in the SIM of the operator of the visited country with those of the identity profile present in the SIN of the roamer user's mobile station.

It should be noted that, in the presence of a second system VIM connected thereto through the IP network, the two systems are co-ordinated in such a way as to assure, in addition to the peculiar identity replacement functionalities described above, that the message exchanged on both interfaces A always comply with the technical specifications produced by the ETSI standardisation body of the GSM system.

Figure 3:
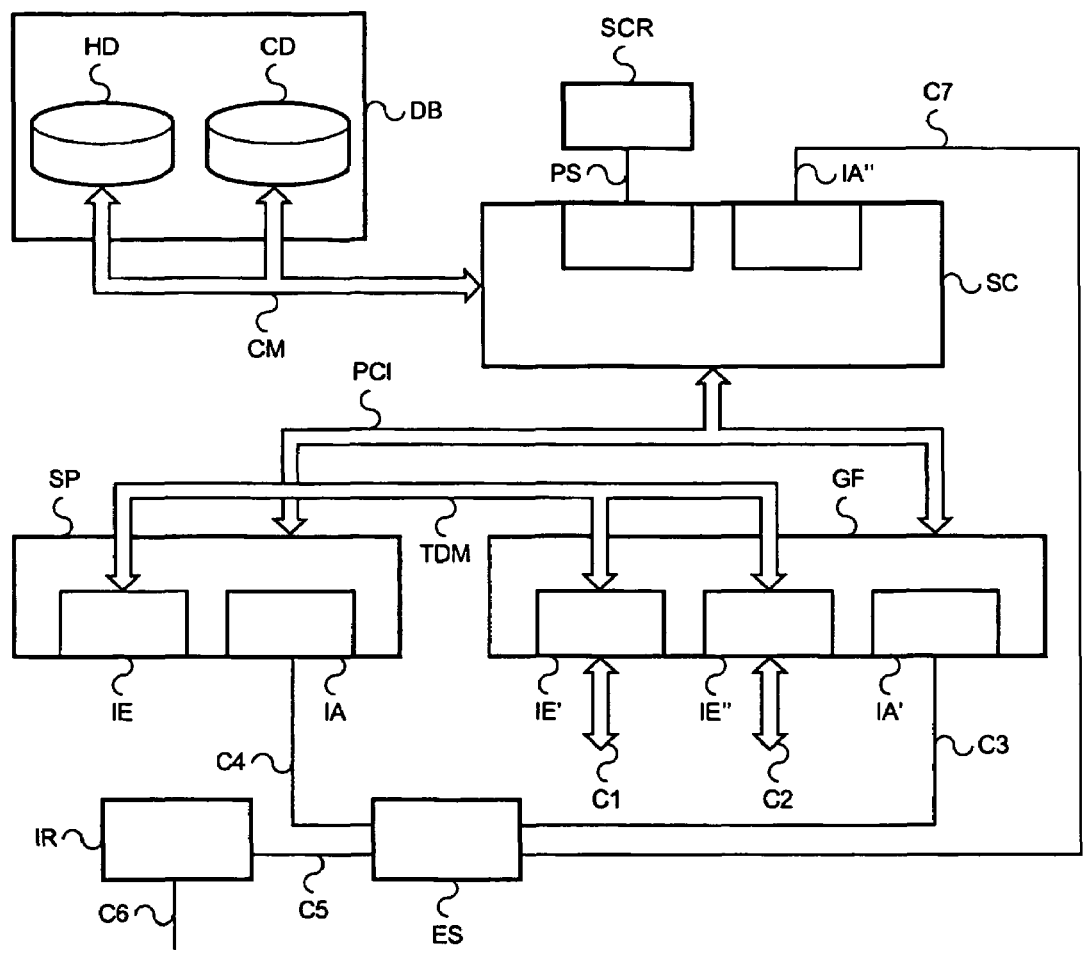
FIG. 3 is a possible embodiment of the system.

A possible architectural realization for the system VIM is shown in FIG. 3.

The realization comprises the following physical modules:

a system controller, indicated as SC: this is the processing card that provides for managing all buses, interfaces and signalling and voice processing cards. It also provides all processing resources not subject to the real time constraint, necessary for the execution of the telephonic application.

The SC card is provided with two transfer ports. A serial port PS is tasked with exchanging data with the SIM Card reader, indicated as SCR. An Ethernet port IA", connected to the connection C7, makes available the Operation & Maintenance information and the information contained in a storage subsystem, indicated as DB;

the storage subsystem DB comprises one or more storage supports of the Hard Disk and CD ROM type, HD and CD: it contains all the mass memories of the system, both those necessary for the operating system, for the application, etc., preferably stored on the Hard Disk, and those necessary for the database of the users who are employees of the company, preferably stored on the CD ROM; the system controller accesses these supports through the CM connection, consisting for instance of a SCSI or EIDE bus;

the SIM Card reader SCR: this is the reader that houses at least a SIM of the same public operator which, as the network provider, authorises the visited company to access the interface A;

a signalling processor and IP Gateway, indicated as SP: the card that is able to analyse, filter, mask and generate signalling messages on common channel number 7, both relating to the interface A, and relating to the Primary Rate Interface (PRI) tasked with transferring the primary ISDN access streams from and to the PEX switchboard. The aforesaid streams are transmitted by means of the digital transmission scheme El, able to transport data at a bit rate of 2.048 Mbps. Inside SP are visible the two data transfer ports, one indicated as IE, which is able to communicate both with the interface A of the GSM, and with the PRI ISDN interface through a TDM bus, the other one, indicated as IA, which corresponds to the Ethernet interface adapted for data transmission at 10/100 Mbps on the connection C4.

SP is also able to operate as signalling transport Gateway because it is able to translate, by means of SCTP protocol, the CCSS number 7 signalling on the circuit switched network into the corresponding signalling on the Internet, used to interconnect multiple system VIMs internationally distributed at distinct private mobile radio networks. The exchange of Internet signalling information between the aforesaid system VINe occurs using the SCTP/IP (Stream Control Transport Protocol / Internet Protocol) signalling protocol, preferred for reasons of efficiency and compliance with the standard. However, another Internet signalling transport protocol instead of the suggested SCTP/IP protocol can be adopted. From the physical layer standpoint, it is possible to extract/insert the CCSS no. 7 signalling time slots of the El streams directly through the TSM standard ECTF H.110), using the extraction and insertion functionality present in this card. The card is also provided with a set of API (Application Programming Interface), i.e. of software functions that, operating in asynchronous mode, allow selective to filter, analyse and replace the DTAP and BSSMAP (Base Station System Management Application Part) components of the different protocol layers adopted on the interface A. In particular, to transfer the CCSS no. 7 signalling message exchanged between the BSC and the MSC of the GSM mobile radio network, the layer 1, 2, 3 and SCCP MTP protocols are used. It should be noted that, in synchronous mode, it is also possible to generate messages independently form those intercepted on the signalling stream;

a voice gateway, indicated as GF: this is the card that processes the voice information transferred between circuit switched and packet switched networks. It is generally equipped with audio transcoders, able to transform 64 Kbps GSM voice streams into corresponding streams at the bit rates standardised at the ITU-T level (for instance, G.723.1, G.728, G.729) or at the ETSI level (GSM FR, HFR, EFR). These voice transcoding operations are conducted to optimise the bandwidth occupied on the IP transport networks used on each occasion. Inside GF are visible three data transfer ports. Through the port indicated as IE' transit the voice and CCSS no. 7 signalling streams of the GSI4 system, present on the connection Cl from and to the switching centre MSC. Through the port indicated as IE"transit the voice and ISDN PRI signalling streams, present on the connection C2 from and to the PEX switch. The third port, indicated as IA', is used to transfer Ethernet streams at 10 Mbps on the connection C3. In addition to the TDM bus, dedicated to computer assisted telephony applications (Computer Telephony), there is also a Compact PCI system bus, computer derived, indicated as PCI, which interconnects both the SP card and the GF card to the system controller SC.

The voice streams coming from the connection C3, as well as the CCSS no. 7 signalling streams coming from the connection C4 and the information coming from the connection C7 access an Ethernet switch, used to combine together the aforesaid streams on the same physical means C5. This switch is used to eliminate collisions between packets of different natures, particularly harmful for the quality of voice transport on IP. The stream on the connection C5 reaches an IR (IP Router) routing apparatus which constitutes the junction element positioned between the LAN (Local Area Network) of the visited company and the Internet Protocol transport WAN (Wide Area Network), connected to the connection C6. This apparatus is connected to the WAN IP network through an appropriate interface, enabled to transmit voice and CCSS no. 7 signalling on IP network, called IP network interface.

The architectural realisation of the system VIM described above is based on innovative hardware and software components and, in addition to the Hard Disk and CD ROM storage supports, on components such as the SCR reader, the SP card and the GF card, provided with the corresponding associated TDM H.110 and Compact PCI buses, currently already available on the market.

The operation of the system shall now be analyzed with reference to the accompanying drawings.

At the time when the roamer user's mobile station enters the radio-electric coverage of the private network of the visited company, the registration procedure is activated which entails the transmission of the IMSI and IMEI identifiers, present respectively in the SIM card of origin and in the mobile terminal.

The system controller SC verifies whether the aforesaid identifiers are present in the storage subsystem DB and, if so, it starts the procedure to replace the identity profile. For this purpose, the SC system requests the SCR to read a new identity profile present in the SIM card belonging to the operator of the visited nation, and the related IMSI identifier is transferred from SCR to the SC through the serial port PS. Moreover, the storage subsystem provides the SC with a new IMEI identifier, enabled by the operator of the visited network.

At this point, similarly with the description of the functional architecture of the system VIM, every time a voice and signalling stream arrives from the BSS to the port IE' of the card GF, it is transferred through the bus TDM to the card SP, which extracts the CCSS no. 7 signalling time slot of the GSM system and provides for:

processing the "Mobility Management"and "Call Control Management"parts of the DTAP component, i.e. replacing the identity profile of the SIM card present in the mobile station with the identity profile of the SIM card read by SCR;

at the end of the aforesaid processing operation, reassembling in the GSM signalling slot the non DTAP component and the two DTAP components of "Mobility Management-"and "Call Control Management"subjected to processing.

Lastly, once the call is set up, the SP card, through the TDM bus, inserts the GSM signalling time slot into the corresponding voice stream transiting on the connection C1 towards the switching centre MSC.

After receiving and recognizing the identifier INSI as its own, the mobile radio network communicates to the mobile station a number called RAND, upon receiving which the mobile station starts the authentication procedure with the visited mobile radio network.

During this procedure, the GSM system provides that in the SIM card of the mobile station the response parameter SRES is calculated by means of the algorithm A3, using a key Ki, uniquely assigned, present in the SIM card itself, and of the RAND number transmitted by the public mobile radio network to the mobile station. In the presence of the system VIM, the authentication procedure can be successfully carried out using the SCR reader able to:

read the key Ki present in the SIM card housed therein;

read the number RAND transmitted on the CCSS no. 7 signalling channel by the mobile radio network of the operator of the visited country. In particular, the number RAND is contained in a signalling time slot present in the CCSS no. 7 signalling stream transiting on the connection C1 that connects the public mobile radio network to the card GF. Through the bus TDM, the card SP intercepts the number RAND from the corresponding signalling time slot and delivers it to the controller SC by means of the bus PCI. The SC uses the serial port PS to transmit the number RAND to the SIM card present in the reader SCR;

read the parameter SRES, obtained as a result of the authentication operation carried out within the SIM card, present in the reader SCR;

communicate the SRES parameter thus obtained to the controller SC through the serial port PS.

The controller SC transmits on the bus PCI the parameter SRES to the card SP, which in turn inserts, by means of the bus TDM, the signalling time slot bearing the parameter SEES into the corresponding CCSS no. 7 signalling stream transiting over the connection C1 towards the switch center MSC of the mobile radio network. Once the authentication is completed and in all cases of voice or data call set-up (for instance SMS) in the presence of the system VIM, although the GSM standard provides for the encryption operation to be conducted by the mobile station, due to the spatial separation between the SIM card present in the SCR reader and the mobile terminal, this encryption operation cannot be carried out. To overcome this drawback, in all cases in which the mobile radio switched network of the visited nation requires the BSC of the BSS subsystem of the mobile radio access network to enable the encryption operation, through the transmission of BSSAP, Base Station System Application Part, (RANAP in the UMTS scenario), signalling messages, the system VIM captures said messages, processes them in such a way as always to disable the encryption operation and transmits the messages thus processed both to the BTS (NODE B) of the corresponding BSC and to the mobile station connected thereto.

In case of activation of the optional GSM registration procedure, adopted for the localisation of the identity profile of the SIM card of origin of the roamer user with the private mobile radio network of origin, the authentication parameters of the original SIM card are used, transmitted through the interfaces provided for connecting the system VIMs on the Internet.

It is evident that the description above has been provided purely by way of non limiting example. Variations and modifications are possible without thereby departing from the scope of protection of the claims.

What is claimed is:

1. A system for managing the identities of mobile stations (MS) roaming between mobile radio networks within a private mobile radio network constituted by one or more base transceiver stations (BTS; Node B) and by a reference base station controller (BSC; RNC), which realize a normal base station subsystem (BSS; RNS) within the public mobile radio network, wherein upon registration of a roaming mobile station (MS) authorised to access the private mobile radio network, the system (Virtual Identity Module (VIM)) simulates, from the base station subsystem (BSS; RNS) towards the mobile switching center (MSC) of the competent network switching subsystem (NSS) which comprises an MSC, Home Location Register (HLR), Visitor Location Register (VLR), and an Authentication Center (AuC) within the public mobile radio network, the behavior of the mobile station, whereto it has associated the identity profile selected from a group of identity profiles held by the operator of the visited network, and simulates, from the mobile switching center (MSC) towards the base station subsystem (BSS), the behavior of the competent network switching subsystem (NSS) during the salient steps of the registration of the roaming mobile station, in such a way as to assure the correct execution of the registration procedure itself.

2. The system as claimed in claim 1 wherein, when the mobile station of the user enters into the coverage of said private mobile radio network and is forced to present itself with its own identifier (IMSI), it verifies whether the user is enabled to replace the identity profile, and, if so, it records said identifier (IMSI) and a mobile terminal code (IMEI) in its interior, associating to the ordered set of data, which define the identity profile of the card of origin present in the mobile station (MS), a second set of data, formally similar to the first and representing the identity profile of the card issued by the visited network operator adopting one of the mobile terminal codes (IMEI) It has available, in replacement of the code of origin of the mobile terminal.

3. The system as claimed in claim 2 wherein said replacement is made operating on the message carried a common channel signalling stream between the mobile switching center (MSC) and the base radio station controller (BSC; RNC) located at the visited network, and extracting each of the time slots on the physical layer to identify and filter a component (DTAP; RANAP), containing the user's identifying parameters, in order subsequently to read, analyse and modify mobility management contents and call control management contents associated to the new identity profile, then reassembling, once the processing operations are complete, the messages with said processed component (DTAP; RANAP).

4. The system as claimed in claim 3 wherein after the identity profile replacement is complete, the system informs the user of its new identity, adopted for the exchange of signalling information with the public mobile radio network, through the transmission of a message which also contains additional parameters, such as the new mobile station ISDN number (MSISDN).

5. The system as claimed in claim 1 wherein the system acquires all time slots coming from the controller (BSC; RNC) carrying signalling data by means of a first withdrawal element (MSN), which extracts therefrom the content relating to a component (DTAP; RANAP) of the message, whilst it passes the content not relating to said component (DTAP; RANAP) to a second injection element (MI), which, once the processing is complete, reassembles the original contents and those processed in the signalling time slots and reinserts the result into the stream directed towards the mobile switching center (MSC).

6. The system as claimed in claim 1 wherein the content relating to a component (DTAP; RANAP) of the message is delivered to a third element (MMSH), where it is processed in the part relating to mobility management, performing the following operations: it uniquely identifies the message carried by the signalling time slot; it reads the corresponding signalling data, representative of the identity profile of the SIM card of origin of the roamer user, in the part pertaining to the mobility management protocol layer; it acquires from a database (DB), internal to the system (VIM), a set of data representative of the profile of the mobile station; it acquires from a reader (SCR) the identity profile of the card made available by the operator of the visited country; it exchanges in orderly fashion the identity profile of the card of the mobile station, contained in the signalling message, with the new identity profile of the card read by the reader (SCR) it analyses whether the message carried by the signalling time slot contains data whose processing is the competence of the call management layer of the component (DTAP; RANAP) itself.

7. The system as claimed in claim 6 wherein if the aforesaid analysis yields a positive response, the message is sent to another element (CMSH), which processes the information carried by the signalling message at the upper call management layer of the protocol stack relating to said component (DTAP; RANAP), performing: the exchange of call management data relating to the identity profile of the card of the mobile station with the data representative of the identity profile of the card issued by the operator, necessary to assure the completion of call management procedures; the transmission of the message containing said component (DTAP; RANAP) thus processed to the second injection element (MI), which inserts it into the appropriate signalling streams.

8. The system as claimed in claim 1 further comprising the following physical modules: a system controller (SC), which provides for the management of all buses, interfaces and signalling and voice processing cards, providing all processing resources not subject to the real time constraint necessary for the execution of the telephone application, and it is provided with a serial port (PS), used to exchange data with said reader (SCR) and with an Ethernet port (IA"), used to share Operation & Maintenance information and the information contained in a storage subsystem (DB); said storage subsystem (DB) comprising one or more storage supports of the Hard Disk (HD) and CD ROM (CD) type, containing all the mass memories of the system, both those necessary to the operating system and to the applications, and those necessary to the database of the users who are employees of the company, and accessible to the system controller (SC) through a bus (CM); said card reader (SCR), which houses at least a card of the operator of the visited network; a signalling processor and IP Gateway (SP), which analyses, filters, masks and generates signalling messages on common channel no. 7 (CCSS no. 7; BB CCSS no. 7), both relating to an interface A (IF', IF"), that connects the mobile switching center (MSC) with the base radio station controller (BSC; RNC) of the base station subsystem (BSS; RNS) located at the visited company, and relating to the interface (PRI) used to transfer the primary ISDN access streams from and to a private switchboard (PBX), using a first data transfer port (IE), and which exchanges data towards an Ethernet network using a second port (IA), also operating as Gateway for the transport of the signalling from the circuit switched network to the Internet, the time slots carrying the aforesaid signalling messages being extracted or inserted directly through a bus (TDM); a gateway (GF) which processes the voice information transferred between the circuit switched and packet switched networks, using appropriate audio transcoders, and is provided with a third data transfer port (IE') through which transit the voice and signalling (CCSS no. 7; BB CCSS no. 7) streams from and towards the switching centre (MSC), with a fourth port (IE") through which the voice and signalling (PRI ISDN) streams are exchanged with the switch (PBX) and with a fifth port (IA') used to transfer the Ethernet streams, a second system bus (PCI) interconnecting both the signalling processor and IP Gateway (SP) and the gateway (GF) to the system controller (SC); an Ethernet switch (ES), which combines together the voice streams (C3), the signalling streams (C4) and the information (C7) coming from the system controller (SC); and a routing apparatus (IR), which joins the local area network (LAN) of the visited company with the Internet Protocol transport network (WAN) connected to the connection (C6), through an appropriate IP network interface, enabled to transmit voice and signalling (CCSS no. 7; BB CCSS no. 7).

9. The system as claimed in claim 8 wherein, upon the activation of the registration procedure, said system controller (SC) verifies the presence of said identifier (IMSI) and of said code (IMEI), present respectively in the card of origin and in the mobile terminal in the storage subsystem (DB) and, if the result of the verification is positive, it requests the reader (SCR) to read a new identity profile present in the card belonging to the operator of the visited network, obtaining the related identifier (IMSI) through a first serial port (PS) and a new identifier (IMEI), enabled by the operator of the visited network, provided by the storage subsystem (DB).

10. The system as claimed in claim 8 wherein, every time a voice and signalling stream arrives from the base station subsystem (BSS; NSS) to a second port (IE') of said gateway (GF), it is transferred by means of said bus (TDM) to the signalling processor and IP Gateway (SP), which extracts the signalling informations (CCSS no. 7; BB CCSS no. 7) and performs the following operations: processing the "Mobility Management" and "Call Control Management" parts of the component (DTAP; RANAP), to replace the identity profile of the card present in the mobile station (MS) with the identity profile of the card read by the reader (SCR); at the end of the aforesaid processing, reassembling in the signalling time slot the contents not relating to said component (DTAP) and the "Mobility Management" and "Call Control Management" contents, relating to the component (DTAP; RANAP); subjected to processing; once the call is set up, inserting by means of the bus (TDM the signalling informations into the corresponding voice stream transiting on a connection (C1) towards the mobile switching center (MSC).

11. The system as claimed in claim 1 wherein, to complete the procedure for authenticating the mobile station with the visited mobile radio network, the calculation of the response parameter (SRES) is conducted using the reader (SCR), which provides for: reading a key (Ki) present in the card housed therein; reading a number (RAND) transmitted on the signalling channel (CCSS no. 7; BB CCSS no. 7) on the connection (C1) by the mobile radio network of the operator of the visited country, intercepted by the signalling processor and IP Gateway (SP) on the bus (TDM) and delivered by means of the second system bus (PCI) to the system controller (SC), which forwards it through said serial port (PS) to the card present in the reader; reading the parameter (SRES), obtained as a result of the authentication operation performed inside the card, present in the reader; communicating the parameter (SRES) thus obtained to the system controller (SC) through the serial port (PS), which provides for transmitting it on the second bus (PCI) to the signalling processor and IP Gateway (SP), which in turn inserts, by means of the bus (TDM), the signalling time slot bearing the parameter (SRES) into the corresponding signalling stream (CCSS no. 7; BB CCSS no. 7) transiting on the connection (C1) towards the mobile switching center (MSC).

12. The system as claimed in claim 1 wherein, in all cases in which the mobile radio switching network of the visited nation requests the base station controller (BSC; RNC) of the base station subsystem (BSS; NSS) of the mobile radio access network to enable the encryption operation by transmitting appropriate signalling messages (BSSAP; RANAP), the system (VIM) captures these messages, processes them in such a way as always to disable the encryption operation and forwards the messages thus processed both to the base transceiver station (BTS; Node B) of the corresponding controller (BSC; RNC), and to the mobile station (MS) connected thereto.

13. The system as claimed in claim 1 wherein the system is connected through said IP network interfaces to other systems (VIM) which, mutually interconnected, form an international network and allow to activate a second registration procedure with the system (VIM) of the private mobile radio network of origin, in order to locate the mobile station situated within the visited private mobile radio coverage of another nation, after replacing the identity profile of the original card with the identity profile of the card owned by the operator of the visited network, the system (VIM) of the visited private mobile radio network being the reference system to assure the correct sequence of the registration procedure.

14. The system as claimed in claim 13 wherein, for the activation of said second registration procedure it uses the authentication parameters of the original card, transmitted through said IP network interface.

15. The system as claimed claim 13 wherein, said mobile and base transceiver stations and said mobile radio networks operate according to the GSM standard.

16. The system as claimed in claim 14, wherein said cards are SIM cards.

17. The system as claimed in claim 14, wherein said mobile and base transceiver stations and said mobile radio networks operate according to the UMTS standard.

18. The system as claimed in claim 17, wherein said cards are USIM cards.

19. The system as claimed in claim 1 wherein, said roaming occurs internationally.

* * * * *